UNITED STATES PATENT OFFICE.

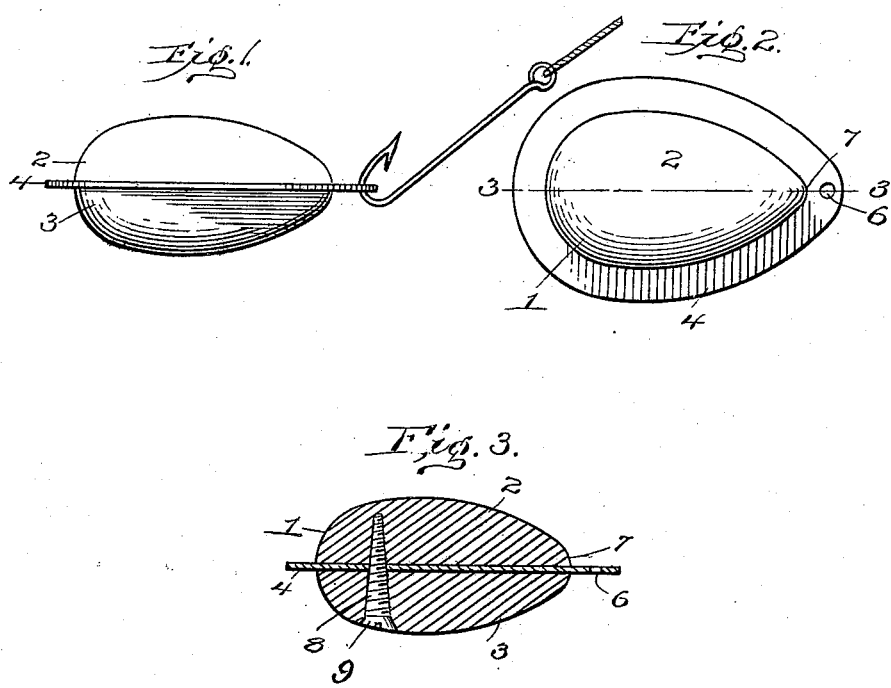

GEORGE H. SLOCUM AND HENRY J. HOKAMP, OF CHICAGO, ILLINOIS.

ARTIFICIAL BAIT.

No. 903,333.   Specification of Letters Patent.   Patented Nov. 10, 1908.

Application filed March 10, 1908. Serial No. 420,214.

*To all whom it may concern:*

Be it known that we, GEORGE H. SLOCUM and HENRY J. HOKAMP, citizens of the United States, residing at Chicago, in the county of Cook and State of Illinois, have invented certain new and useful Improvements in Artificial Bait; and we do hereby declare the following to be a full, clear, and exact description of the invention, such as will enable others skilled in the art to which it appertains to make and use the same.

This invention relates to improvements in artificial bait for fishing, and has for an object the provision of an artificial bait of any desired color arranged to be used in connection with any desired structure of hook, the bait being of such shape as to give the appearance of a live object moving through the water when the same is in use.

A further object in view is the provision of an artificial bait adapted to move or rise over the waves on the order of a boat so as to give the appearance of a living object moving across the water.

With these and other objects in view the invention comprises certain novel constructions, combinations and arrangement of parts as will be hereinafter more fully described and claimed.

In the accompanying drawings: Figure 1 is a side elevation of the preferred embodiment of the present invention. Fig. 2 is a top plan view of the structure shown in Fig. 1. Fig. 3 is a section through Fig. 2 on line 3—3.

Referring to the drawing by numerals, 1 indicates a body portion of a bait formed into parts 2 and 3 and having positioned therebetween a strip 4 preferably of leather. The parts 2 and 3 are formed preferably of cork or any other light material may be used, the main requisite being that the same shall be capable of floating and projecting above the water. The central strip 4 is secured to the parts 2 and 3 by any desired means, preferably by a good quality of cement and is designed to project out from the body portion 1 of the bait substantially an even distance all the way round. The member 4 is formed with an opening 5 in one end for securing a bait to the line. It will be evident that a hook may be secured in the opening 5 and a fishing line secured to the hook.

In constructing body portion 1 the same is preferably formed substantially egg shape so as to provide a point at 7 which is designed to point toward the string or cord when in use. In addition to the cement holding members 2, 3 and 4 together a fastening means as screw 8 is provided and is so positioned in the body portion 1 that the head 9 at the end of the screw to which the same is secured is positioned on one side of the central member or leather portion 4 so as to form a balancing member or weight. This will cause the bait to remain with one particular side upward at all times.

In operation the hook is positioned at any desired place in proximity to the bait, preferably in opening 6, and a cord or line secured to the hook. The bait, by reason of its balancing weight 8, will float evenly with one of the members 2 or 3 positioned upward with the point 7 pointed toward the line. If the water is more or less rough the bait will easily ride over the same on the order of a boat riding over waves so that a comparatively large surface of the bait will be visible at all times.

The bait is painted any desired color, preferably some bright color that will attract the fish, and is of particular advantage in use with game fish, so that when the bait and hook are trolled through the water the bait may move up and down over the waves of the water on the order of a living object, and thereby attract to a considerable extent the attention of the fish. The projection of the center strip 4 beyond the body 1 is adapted to produce this motion largely, and particularly when the water is very rough, it causes an up and down motion.

In making a cast the bait will sink into the water and will again slowly rise to the surface, the same being retarded by the projection of member 10.

What we claim is:

1. In an artificial bait, a body portion, a central portion of different material from said body portion projecting beyond the body portion around the entire periphery thereof, and means for securing said central portion to said body portion.

2. In an artificial bait, a body portion, a strip of leather secured thereto and projecting beyond the same around the entire periphery thereof, and means for securing said leather strip to said body portion.

3. In an artificial bait, a body portion forming a plurality of parts, a strip of leather positioned between said parts and projecting beyond the periphery thereof, said projecting portion extending entirely around said body portion, a balancing and securing member passing through one of said parts, said leather strip, and into the other of said parts for holding said parts and said strip together and for balancing said body portion.

In testimony whereof we affix our signatures in presence of two witnesses.

GEORGE H. SLOCUM.
HENRY J. HOKAMP.

Witnesses:
Jos. Rush,
James B. Slocum.